United States Patent [19]

Degenhardt

[11] Patent Number: 4,587,036
[45] Date of Patent: May 6, 1986

[54] X-RAY IMAGE STORAGE SCREEN
[75] Inventor: Heinz Degenhardt, Erlangen, Fed. Rep. of Germany
[73] Assignee: Siemens Aktiengesellschaft, Berlin & Munich, Fed. Rep. of Germany
[21] Appl. No.: 673,736
[22] Filed: Nov. 21, 1984
[30] Foreign Application Priority Data
Dec. 27, 1983 [DE] Fed. Rep. of Germany ....... 3347207
[51] Int. Cl.$^4$ .............................................. C09K 11/08
[52] U.S. Cl. ........................... 252/301.4 H; 250/337; 250/483.1; 250/484.1; 428/691
[58] Field of Search ............. 252/301.4 H; 250/484.1, 250/337, 483.1; 428/691

[56] References Cited

U.S. PATENT DOCUMENTS

| | | | |
|---|---|---|---|
| 3,975,637 | 8/1976 | Ikedo et al. | 250/327 |
| 4,011,455 | 3/1977 | Waller et al. | 250/486 |
| 4,088,894 | 5/1978 | Rabatin | 252/301.4 H |
| 4,138,529 | 2/1979 | Mori et al. | 252/301.4 H |
| 4,157,981 | 6/1979 | Stevels et al. | 252/301.4 H |
| 4,239,968 | 12/1980 | Kotera et al. | 252/301.4 H |
| 4,336,154 | 6/1982 | Nishimura et al. | 252/301.4 H |

FOREIGN PATENT DOCUMENTS 0021174 7/1981 European Pat. Off. .
2286872 4/1976 France .
2306250 10/1976 France .

*Primary Examiner*—Arthur P. Demers
*Attorney, Agent, or Firm*—Hill, Van Santen, Steadman & Simpson

[57] ABSTRACT

An x-ray image storage screen for use in converting x-ray images into video pictures by the use of applied heat, such as a laser beam, has an active substance for the storage layer which is an alkaline earth-mixed halogen system having the formula $BaF_2(Br, Cl):Eu:Sr$, with barium fluoride ($BaF_2$) comprising 0.6 mol, and the barium chloride ($BaCl_2$) and the barium bromide ($BaBr_2$) comprising the remaining 0.4 mol, preferably in equal portions, and wherein the activator europium (Eu) does not exceed $10^{-4}$ g-atom and the activator strontium (Sr) does not exceed $10^{-2}$ g-atom.

6 Claims, 2 Drawing Figures

X-RAY IMAGE STORAGE SCREEN

BACKGROUND OF THE INVENTION

1. Field of the Invention

The present invention relates to an x-ray image storage screen, and in particular to such a storage screen for use in exposure devices for converting x-ray images into video pictures.

2. Description of the Prior Art

A device for storing and displaying a radiation image wherein an x-ray image is converted into a video picture is described in U.S. Pat. No. 3,975,637. Devices of this type make use of phosphorescent or luminescent substances forming a storage layer, and the stored signals are obtained from the storage layer by the use of applied heat, such as a laser beam. In general, the incident x-ray image excites electrons in the storage material, these electrons being captured and retained. For readout, the layer is scanned line-by-line with an infrared beam, such as a laser beam. The captured electrons are then released and emit light. The emitted light is converted into a signal sequence corresponding to the scanning, such conversion occurring, for example, in an optical detector such as a secondary electron multiplier. This signal sequence can then be edited and displayed in a manner standard for television.

Highly sensitive luminescent systems which can be stimulated by radiation are required for such storage and readout. Known substances of this type, for example those described in the aforementioned U.S. Pat. No. 3,975,637, such as alkali and alkaline earth halogens, sulfates, borates, sulfides and silicates, however, are stimulated by infrared radiation at a level which is too low for use in medical radiology.

One attempted solution to this problem has been the use of activated barium fluorohalogen luminescent systems. A barium fluorohalogen system is described in European patent application 0 021 174, this system additionally containing a further alkaline earth or zinc or cadmium, and a europium activator. This system, however, exhibits too high an enertia for many uses, that is, the scan rate is too low.

Another barium fluorohalogen system which contains activators is described in European patent No. 0021342. One such system described therein consists of equal amounts of barium fluoride ($BaF_2$) and barium bromide ($BaBr_2$) and contains 0.1 mol strontium fluoride ($SrF_2$) as well as europium chloride ($EuCl_3$) as an activator. The stated purpose of this system is to achieve improved illumination intensity. This system, however, is not chemically stable.

SUMMARY OF THE INVENTION

It is an object of the present invention to provide a luminescent system for use in an x-ray image storage screen which is highly sensitive to infrared radition and which permits a rapid readout of the stored information.

The above object is inventively achieved in an x-ray image storage screen having a storage layer containing an alkaline earth-mixed halogen having the formula $BaF_2(Br,Cl):Eu:Sr$ wherein the elements in paranthesis indicate combinations with barium in addition to barium fluoride. In 1 mol of this active substance, barium fluroide constitutes a portion in the range of 0.4 through 0.8 mol, preferably 0.6 mol, and the remainder needed for 1 mol consists of approximately equal parts of barium chloride and barium bromide, specifically 0.2 mol barium chloride and 0.2 mol barium bromide. The activators europium and strontium are present in amounts up to $10^{-4}$ g-atom europium and up to $10^{-2}$ g-atom strontium, preferably $5\times10^{-5}$ g-atom europium and $10^{-3}$ g-atom strontium. In general, europium may be present in a range between approximately $10^{-5}$ and approximately $10^{-4}$ g-atom, and strontium may be present in a range of approximately $10^{-4}$ and approximately $10^{-2}$ g-atom.

The system disclosed and claimed herein achieves both increased sensitivity and illumination upon readout. An optimum signal is achieved for 1 mol of this material when, as stated above, barium bromide constitutes 0.6 mol and the remainder of the mol the equally divided between barium chloride and barium bromide at 0.2 mol each. A luminescent system is thus obtained yielding an optimum readout with a helium-neon laser operating at 5 mW having a formula: $BaF_{0.6}(Cl_{0.2}, Br_{0.2}):Eu:Sr$, wherein the concentrations of the activators are $Eu:\leq 10^{-4}$ g-atom Eu/mol $BaF(Cl,Br)$ and $Sr:\leq 10^{-2}$ g-atom Sr/mol $BaF(Cl,Br)$. The mixed crystals exhibit a tetragonal crystal structure, and have a glow peak at 335° K.

For this optimum composition, the system, in comparison to known barium fluorohalogen systems, generates twice as high a signal as BaF Cl, and has a time constant which is lower by a factor of 8 then BaF Cl. The time constant for the system disclosed and claimed herein is better by a factor of 2 than the known BaF Br system described in the aforementioned European application No. 0 021 174.

The system disclosed and claimed herein has a signal level which is greater by a factor of 2 and a time constant which is also better by a factor of two than the system described in the aforementioned European patent No. 0 021 342. Moreover, the system described herein is stable with respect to moisture, whereas the system described in European patent No. 0 021 342, which contains no Ba Cl$_2$, and which contains an order of magnitude more strontium, decomposes in water.

The luminescent system disclosed herein can be manufactured by mixing 0.6 mol barium fluoride, 0.2 mol barium chloride and 0.2 mol barium bromide in a ball mill with $10^{-4}$ mol $EuF_3$ and $10^{-2}$ mol SrCl. After the mixing process is completed, the resulting raw material is supplied to a glow crucible and is annealed in a bromium vapor atmosphere at 800° C. through 1000° C., preferably 800° C. for one through five hours, preferably two hours. After cooling, the product is comminuted and is washed with water and dried.

DESCRIPTION OF THE PREFERRED EMBODIMENTS

Figure 1:
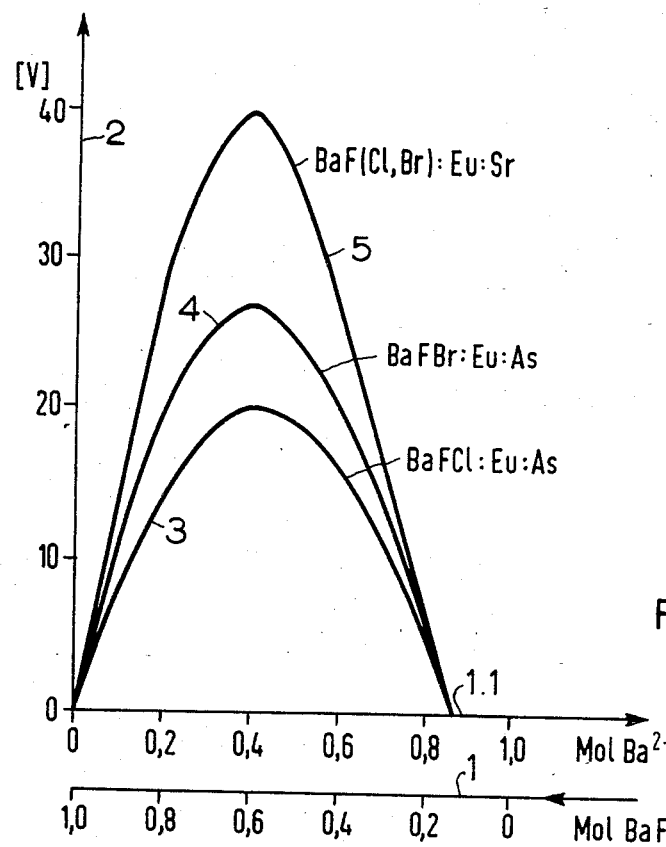
FIG. 1 shows various illumination signals plotted against barium fluoride content and against the content of other barium halogens.

A graph showing a luminescent system in which the amounts of barium fluoride ($BaF_2$) used therein are indicated on an abscissa 1 (right to left) and the amounts of other barium halogens employed in the luminescent systems are indicated on an abscissa 1a (left to right) is shown in FIG. 1. The obtainable signal is entered on the ordinate 2. A curve 3 characteristic of a BaF Cl:Eu:As system shows an optimum signal output at about 20 volts when the ratio of 0.6 mol to 0.4 mol of barium fluoride to other barium halogens disclosed and claimed herein is utilized. Another curve 4 shows the signal output of a system consisting of BaF Br:Eu:As wherein the same ratio has been observed, this showing a maximum signal output of about 37 volts. The system disclosed and claimed in the present application, also employing the inventive ratio, is represented by a curve 5 which indicates a maximum signal output of 40 volts, this system having the general formula BaF (Cl, Br):Eu:Sr.

Figure 2:
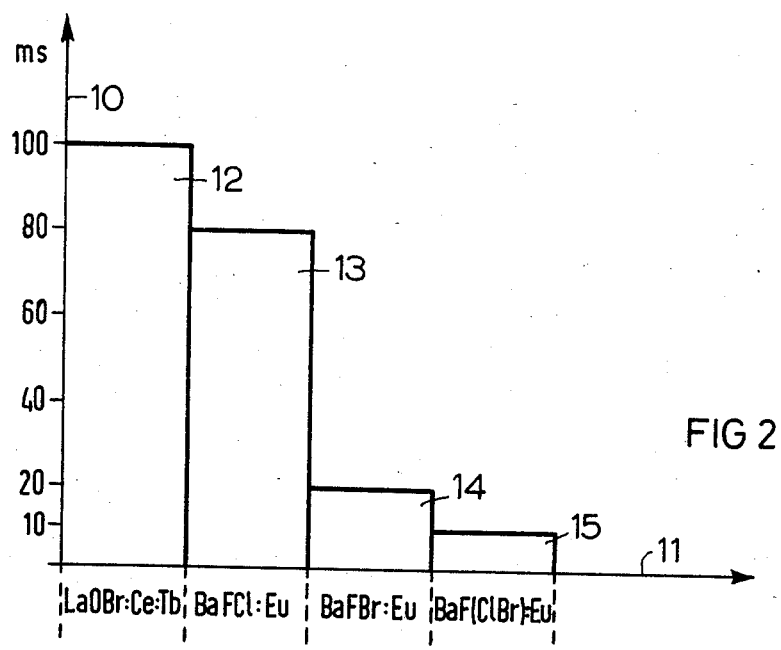
FIG. 2 shows time constants for various luminescent systems.

Another graph is shown in FIG. 2 comparing the time constants of various luminescent systems. This graph has an abscissa 11 on which the various luminescent systems are entered, and an ordinate 10 indicating the time constant in milliseconds. The left-most column 12 represents a luminescent system of lanthanum oxibromide which is activated with cerium and terbium, which has a time constant of 100 milliseconds. Column 13 is for a BaF Cl:Eu system, which has a time constant of 80 milliseconds. Column 14 is for a BaF Br:Eu system, which has a time constant of 20 milliseconds. Column 15 is for the luminescent system disclosed and claimed herein, BaF(Cl,Br):Eu, which has a time constant of only 10 milliseconds. The significant improvement in time constant behavior in comparison to conventional systems is thus evident.

Although modifications and changes may be suggested by those skilled in the art it is the intention of the inventor to embody within the following claims all modifications and changes as reasonably and properly come within the scope of his contribution to the art.

I claim as my invention:

1. An x-ray image storage screen having a storage layer consisting of an alkaline earth-mixed halogen of the formula BaF(Cl,Br):Eu:Sr as the active substance wherein each mole contains barium fluoride in the range of approximately 0.4 through 0.8 mol and the remainder of said 1 mol consists of approximately equal portions of barium chloride and barium bromide, and wherein europium and strontium are employed as activators in an amount of up to $10^{-4}$ g-atom europium and up to $10^{-2}$ g-atom strontium.

2. An x-ray storage screen as claimed in claim 1 wherein said active substance has 0.6 mol barium fluoride and 0.2 mol barium chloride and 0.2 mol barium bromide.

3. An x-ray storage screen as claimed in claim 1 wherein said layer contains europium in an amount in the range between approximately $10^{-5}$ and $10^{-4}$ g-atom.

4. An x-ray image storage screen as claimed in claim 3 wherein said layer has europium in an amount of $5\times10^{-5}$ g-atom.

5. An x-ray image storage screen as claimed in claim 1 wherein said layer has strontium in an amount in the range of approximately $10^{-4}$ through $10^{-2}$ g-atom.

6. An x-ray image storage screen as claimed in claim 5 wherein said layer has strontium in an amount of $10^{-3}$ g-atom.

* * * * *